(12) United States Patent
Yoshinaga et al.

(10) Patent No.: US 9,233,650 B2
(45) Date of Patent: Jan. 12, 2016

(54) DECORATIVE COATING (75) Inventors: Fumitaka Yoshinaga, Toyota (JP); Hiroshi Yanagimoto, Miyoshi (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 226 days.

(21) Appl. No.: 14/000,492

(22) PCT Filed: Feb. 20, 2012

(86) PCT No.: PCT/IB2012/000298
§ 371 (c)(1),
(2), (4) Date: Aug. 20, 2013

(87) PCT Pub. No.: WO2012/114180
PCT Pub. Date: Aug. 30, 2012

(65) Prior Publication Data
US 2013/0330525 A1 Dec. 12, 2013

(30) Foreign Application Priority Data
Feb. 22, 2011 (JP) ................. 2011-036104

(51) Int. Cl.
B60R 13/00 (2006.01)
B32B 3/10 (2006.01)
B32B 5/16 (2006.01)
B32B 15/08 (2006.01)
H01Q 1/32 (2006.01)
H01Q 1/42 (2006.01)

(52) U.S. Cl.
CPC ............... *B60R 13/005* (2013.01); *B32B 3/10* (2013.01); *B32B 5/16* (2013.01); *B32B 15/08* (2013.01); *H01Q 1/3283* (2013.01); *H01Q 1/422* (2013.01); *H01Q 1/425* (2013.01); *H01Q 1/3233* (2013.01); *Y10T 428/24851* (2015.01); *Y10T 428/24893* (2015.01); *Y10T 428/24909* (2015.01); *Y10T 428/2991* (2015.01)

(58) Field of Classification Search
CPC ............... B60R 13/005; Y10T 428/24802; Y10T 428/24893; Y10T 428/24909; Y10T 428/24917; Y10T 428/24851; Y10T 428/24868; Y10T 428/24876; H01Q 1/422; H01Q 1/425
See application file for complete search history.

(56) References Cited

U.S. PATENT DOCUMENTS

| 6,184,842 B1 | 2/2001 | Leinweber et al. |
| 6,328,358 B1 | 12/2001 | Berweiler |
| 2009/0169892 A1 | 7/2009 | Bazzi et al. |
| 2011/0236672 A1 | 9/2011 | Yanagimoto et al. |

FOREIGN PATENT DOCUMENTS

| JP | 2000-159039 A | 6/2000 |
| JP | 2003-138222 A | 5/2003 |
| JP | 2007-284284 A | 11/2007 |
| JP | 2009-280857 A | 12/2009 |
| WO | 01/88540 A1 | 11/2001 |
| WO | 2007/107574 A2 | 9/2007 |
| WO | 2010/064285 A1 | 6/2010 |

OTHER PUBLICATIONS

International Search Report for corresponding International Patent Application No. PCT/IB2012/000298 mailed Jan. 31, 2013.

*Primary Examiner* — Gerard Higgins
(74) *Attorney, Agent, or Firm* — Sughrue Mion, PLLC

(57) ABSTRACT

A decorative coating (10) that is formed on a surface of a resin substrate F that is placed on a path an electromagnetic waves of a radar device, and the decorative coating (10) is composed of a layer (2) in which metal nanoparticles (1) are covered with an inorganic oxide material.

4 Claims, 6 Drawing Sheets

DECORATIVE COATING

BACKGROUND OF THE INVENTION

1. Field of the Invention

The present invention relates to a decorative coating that is formed on a surface of a resin substrate that is placed on a path of electromagnetic waves of a radar device.

2. Description of Related Art

The antennae of a communication device or radar that sends and receives radio waves have almost no limitations on its design and the structure around it because a priority is placed on its function. For example, as the antenna for a vehicle radio, a barely-formed rod antenna is used. In some cases, an antenna is wanted to be placed in an out-of-sight location depending on where it is attached. For example, a radar which measures the distance to an obstacle ahead of the vehicle or the distance to the preceding vehicle is preferably placed at the center of the front of the vehicle for its best performance. In such a case, the antenna is located in the vicinity of the front grill of the vehicle, for example, and is preferably not visible from the exterior for design reasons.

An auto-cruise system, which is a technology that measures the information such as the distance or relative speed to the preceding vehicle with a sensor mounted on a front part of a vehicle and controls the throttle or brake based on the measured information to accelerate or decelerate the vehicle to control the distance to the preceding vehicle, is attracting attentions in recent years as one of intelligent transport system (ITS) technologies which aim at relieving traffic congestion and reducing traffic accidents. As a sensor for the auto-cruise system, a radio wave transmitter-receiver, such as millimeter-wave radar, is usually used.

A radar device which is mounted on a front part of a vehicle body is usually located behind the front grill, however, the emblem of the manufacturer of the vehicle and ornaments that are specially designed for the vehicle are usually attached to the front grill. The millimeter waves from the radar device is directed forward through the front grill and emblem and reflected by an object such as a preceding vehicle or an obstacle ahead, and the reflected waves return to the radar device through the front grill. Thus, it is preferred that a material or paint which causes little radio-wave transmission loss and can provide desired good appearance is used for the portions of the front grill, emblem, etc. which are placed on a beam path of the radar device.

For the above reasons, front grills usually have a window through which radio waves can pass at a position corresponding to the location of the radio wave transmitter-receiver so that radio waves can travel through the window. On the other hand, however, the window breaks the continuity of the appearance of the front grill, and may spoil the appearance of the vehicle because it makes the radio wave transmitter-receiver or engine room in the vehicle visible from the exterior. Thus, a cover (decorative coating) which is transmissive to radio waves is usually inserted in the window of the front grill so that the window and the front grill appear consistent as disclosed, for example, in Japanese Patent Application Publication No. 2000-159039 (JP-A-2000-159039).

Figure 6:
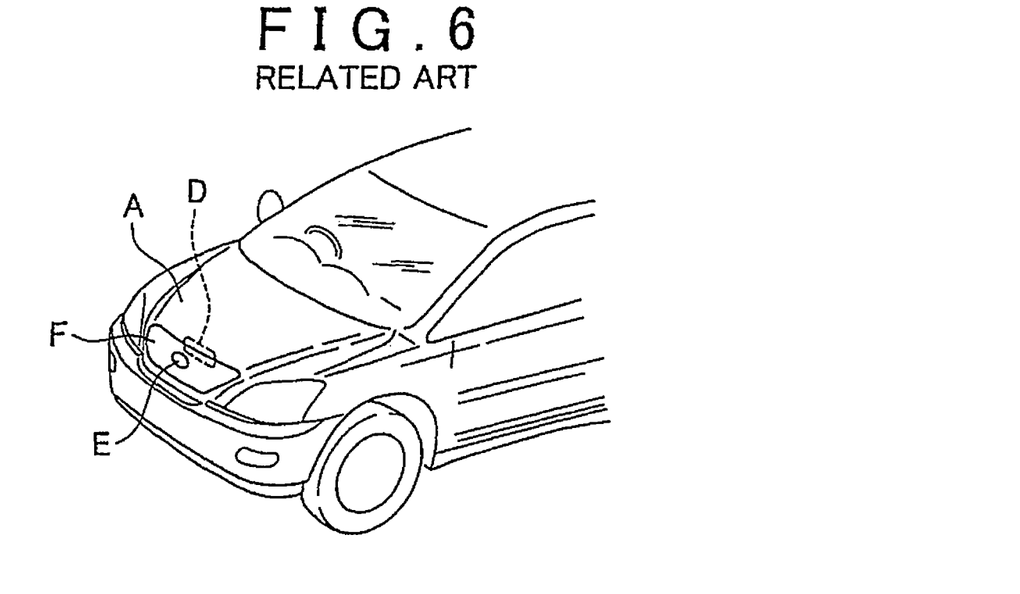
FIG. 6 is a schematic view that illustrates the relationship between the front grill (resin substrate) at the front of a vehicle and a radar device that is located behind the resin substrate in the vehicle.
Figure 7:
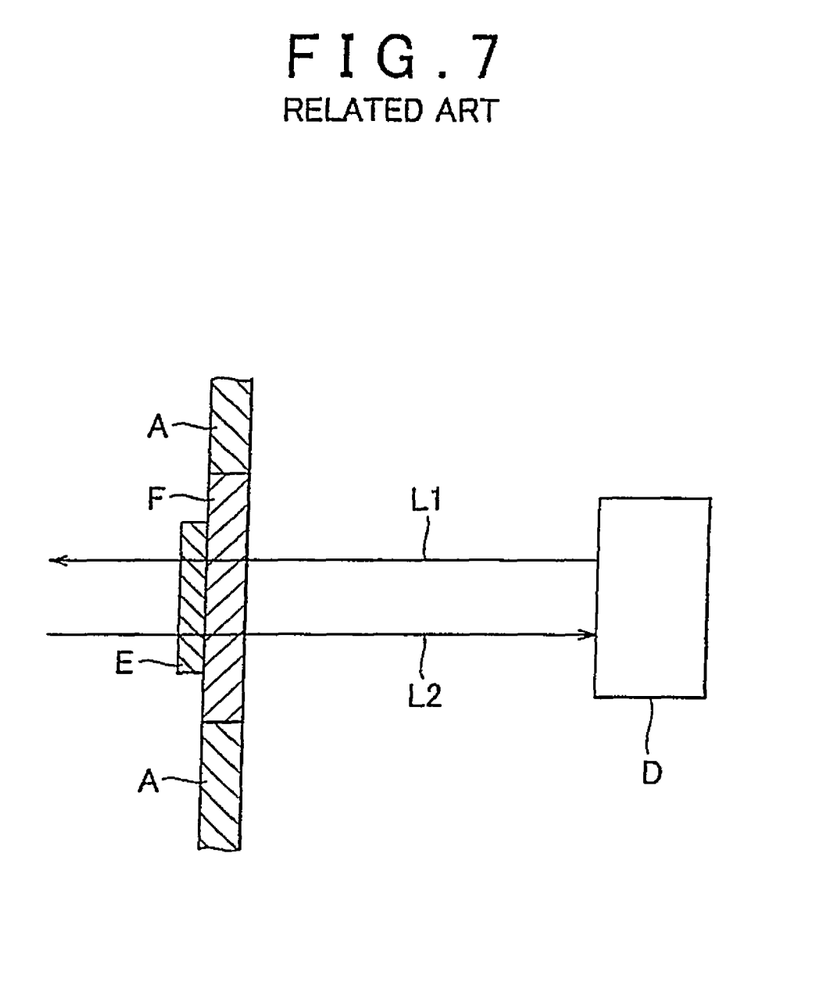
FIG. 7 is a vertical cross-sectional view that illustrates a conventional decorative coating that is formed on a resin substrate, which illustrates the situation in which millimeter-waves that are emitted from a radar device are directed forward through the resin substrate and reflected waves from an object ahead return to the radar device through the resin substrate.

This is explained with reference to FIGS. 6 and 7. As shown in FIG. 6, a radar device D which is provided on a front part of a vehicle body A is located behind a front grill F. As shown in FIG. 7, the millimeter waves from the radar device D (millimeter waves L1) are directed forward through the front grill F or an emblem E and reflected by an object, such as a preceding vehicle or an obstacle ahead, and the reflected waves (millimeter waves L2) return to the radar device D through the emblem E or the like. A decorative coating is provided on the emblem E.

Figure 8A:
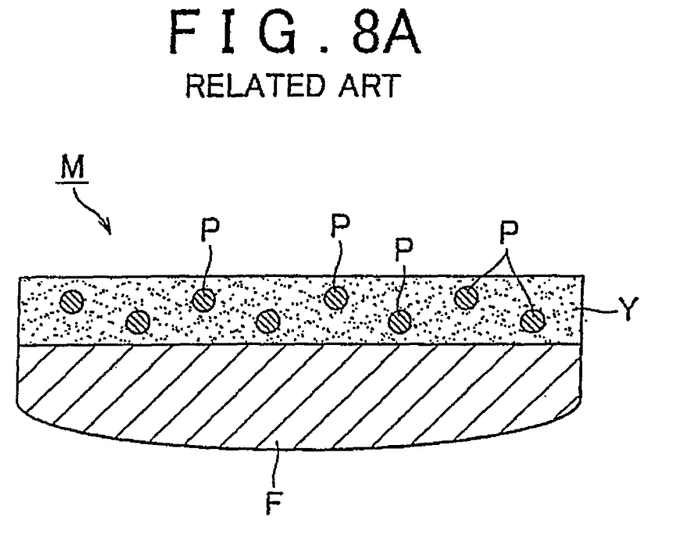
FIG. 8A and FIG. 8B are schematic views that illustrate a comparative example of a decorative coating.
Figure 8B:
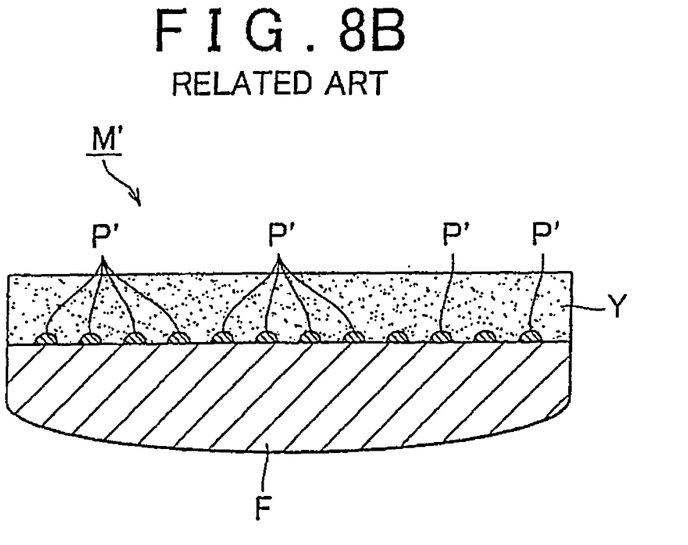

There are two embodiments, as shown in FIGS. 8A and 8B, of the decorative coating which is provided on the reverse side of the front grill F and on the path the electromagnetic waves of the radar device. A decorative coating M that is shown in FIG. 8A is composed of an organic substance layer Y in which nanoparticles P of a metal material, such as gold or an alloy thereof, silver or an alloy thereof, tin or an alloy thereof, or indium or an alloy thereof, are dispersed.

A decorative coating M' that is shown in FIG. 8B schematically illustrates the decorative coating that is disclosed in JP-A-2000-159039, and includes metal nanoparticles P' of indium or the like that are vapor-deposited discontinuously on a surface of a front grill F, and an organic substance layer Y that is formed over the metal nanoparticles P'.

Such a decorative coating is usually evaluated in terms of its performance by a weathering test, such as xenon accelerated lightfastness and weathering test. According to the inventors, when metal nanoparticles are protected by an organic substance layer as shown in FIGS. 8A and 8B, the organic substance layer is easily deteriorated by the thermal energy that is emitted from an arc lamp during the weathering test, and new problems that are associated with the deterioration of the organic substance layer, such as oxidation of the metal nanoparticles, increased susceptibility to deterioration of the decorative coating due to the oxidation of the metal nanoparticles, and change in the color tone of the decorative coating, have been found.

SUMMARY OF THE INVENTION

The present invention relates to a decorative coating that is formed on a surface of a resin substrate that is placed on a path of electromagnetic waves of a radar device, and provides a decorative coating which is effectively prevented from a decrease in durability during a weathering test due to oxidation of metal nanoparticles that form a portion of the decorative coating.

An aspect of the present invention relates to a decorative coating that is formed on a surface of a resin substrate that is placed on a path of electromagnetic waves of a radar device. The decorative coating includes metal nanoparticles, and an inorganic oxide material that covers the metal nanoparticles.

Because the decorative coating of the present invention is formed on a surface of a resin substrate that is placed on a path of electromagnetic waves of a radar device, it is a coating which has metallic luster in appearance and is transmissive to radio waves (electrically insulative). Although the decorative coating could be an electrically-conductive coating because it has metallic luster, it has metallic luster but is electrically insulative because the metal nanoparticles are covered with an inorganic oxide material. This is because the distances between the particles are quite small since the metal is in the form of nanoparticles. Thus, the particles are present at such a high density that the particles provide metallic luster as seen by human eyes and cause little millimeter wave loss when radio waves pass through individual nanoparticles. As a result, the decorative coating has metallic luster in appearance but is electrically insulative. The term "millimeter waves" means radio waves in a frequency band of approximately 30 GHz to 300 GHz among electromagnetic waves, and radio waves with a frequency of approximately 76 GHz can be considered as typical examples.

In addition, because the metal nanoparticles are covered with an inorganic oxide material, the metal nanoparticles are protected from the thermal energy that is emitted from an arc lamp during a weathering test, such as xenon accelerated lightfastness and weathering test. Thus, the decorative coating is prevented from a decrease in durability due to the oxidation of the metal nanoparticles.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Representative embodiments of "a decorative coating that is composed of a layer in which metal nanoparticles are covered with an inorganic oxide material" include the following four embodiments.

In a first embodiment, metal nanoparticles that are coated with an inorganic oxide coating are dispersed in a layer of an organic substance.

Metal nanoparticles are mixed in a solvent and an inorganic oxide material is also mixed in the solvent. The inorganic oxide is precipitated on surfaces of the metal nanoparticles to form a layer of the inorganic oxide. Metal nanoparticles that have been coated with an inorganic oxide material as described above are mixed in a solvent, such as ethanol, and an additional solvent for dilution and dispersion, such as toluene, is mixed in the mixture to form a liquid mixture. By coating the liquid mixture on a surface of a resin substrate (by spray coating or bar coating and subsequent drying), a decorative coating that is composed of a layer of an organic substance in which metal nanoparticles that are coated with an inorganic oxide coating are dispersed can be formed.

In a second embodiment, metal nanoparticles that are coated with an inorganic oxide material are discontinuously formed in a layer on a surface of a resin substrate, and a layer of an organic substance is formed over the metal nanoparticles.

For example, metal nanoparticles that are coated with an inorganic oxide material can be discontinuously formed in a layer on a surface of a resin substrate by depositing metal nanoparticles discontinuously on a surface of a resin substrate by vacuum deposition, sputtering or ion plating, which are included in PVD methods, or thermal CVD, plasma CVD or laser CVD, which are included in CVD methods, and coating the metal nanoparticles with a coating liquid that is obtained by mixing an inorganic oxide material in a solvent. When a layer of an organic substance is formed over the metal nanoparticles, the decorative coating can be formed.

In a third embodiment, metal nanoparticles are dispersed in a layer of an inorganic oxide material.

A decorative coating that is composed of a layer of an inorganic oxide material in which metal nanoparticles are dispersed can be formed by mixing metal nanoparticles and an inorganic oxide material in a solvent to prepare a coating liquid, and coating a surface of a resin substrate with the coating liquid.

In this embodiment, even if the organic substance layer is deteriorated by the thermal energy that is emitted from an arc lamp during a xenon accelerated lightfastness and weathering test, the oxide coating around the metal nanoparticles prevents the metal nanoparticles from aggregation.

In a fourth embodiment, metal nanoparticles are discontinuously formed in a layer on a surface of a resin substrate, and a layer of an inorganic oxide material is formed over the metal nanoparticles.

In any of the above embodiments, the decorative coating is composed of a layer in which metal nanoparticles are covered with an inorganic oxide material. Thus, the decorative coating has good transparency to radio waves, and is prevented from oxidation of the metal nanoparticles and a decrease in durability due to oxidation of the metal nanoparticles as seen during a weathering test.

The inorganic oxide coating preferably has a thickness in the range of 3 to 50 nm.

The upper and lower limits of the thickness were determined based on the results of an experiment on a decorative coating in which metal nanoparticles were coated with an inorganic oxide coating that was conducted by the inventors in order to investigate the radio wave transmission loss and reflectivity by varying the thickness of the inorganic oxide coating.

The layer of an inorganic oxide material preferably has a thickness in the range of 100 rim to 3 µm.

The upper and lower limits of the thickness were determined based on a xenon accelerated lightfastness weathering test that was conducted by the inventors on a decorative coating whose layer as a whole is made of not an organic substance but an inorganic oxide material. In the xenon accelerated lightfastness weathering test, the degree of change in color tone and the presence or absence of peeling (adhesion) of the layer were investigated.

As can be understood from the above description, according to the decorative coating of the present invention, the metal nanoparticles that form the decorative coating are covered with a layer of an inorganic oxide material. Thus, a decorative coating which does not undergo a significant change in hue (color tone) after a weathering test and which is prevented from oxidation of the metal nanoparticles and a decrease in durability due to oxidation of the metal nanoparticles as seen during a weathering test can be provided.

Description is hereinafter made of embodiments of the present invention with reference to the drawings. Each of FIGS. 1 to 4 is a schematic view that illustrates an embodiment of the decorative coating according to the present invention.

Figure 1:
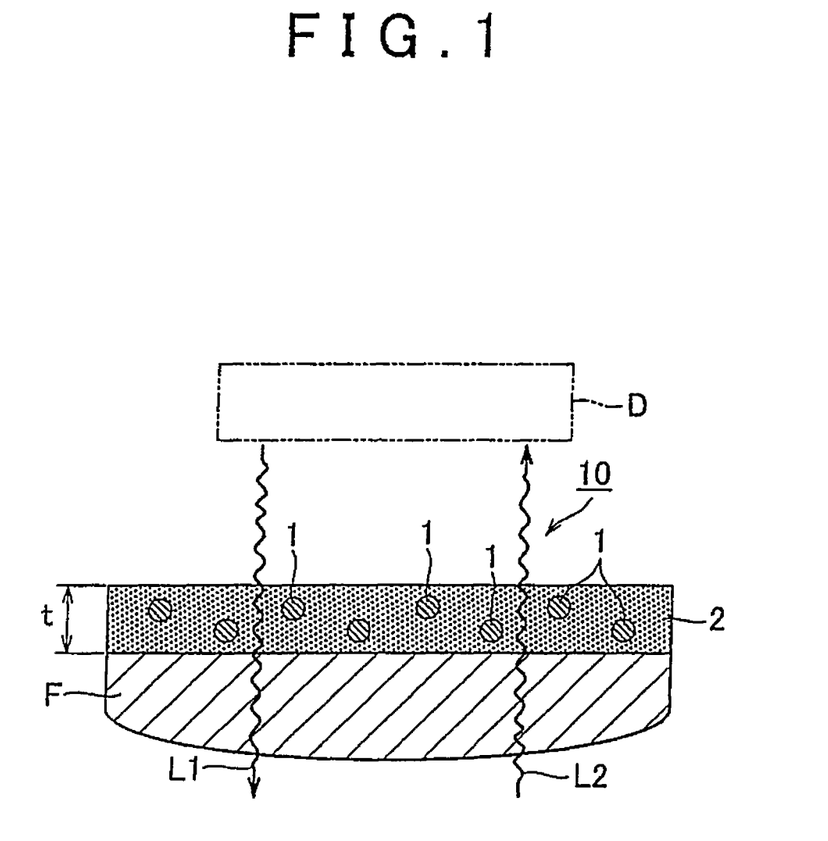
FIG. 1 is a schematic view that illustrates one embodiment of a decorative coating according to the present invention.

A decorative coating 10 that is shown in FIG. 1 is provided at a position opposed to a radar device D on the reverse side of a front grill F as a resin substrate. Millimeter-waves L1 that are emitted from the radar device D are directed forward through the front grill F and the decorative coating 10 and reflected by an object such as a preceding vehicle or an obstacle ahead. The reflected millimeter-waves L2 return to the radar device D through the front grill F and the decorative coating 10.

The illustrated decorative coating 10 is composed of an inorganic oxide layer 2 in which metal nanoparticles 1 are dispersed.

The metal nanoparticles are made of at least one metal material selected from gold and alloys thereof, silver and alloys thereof, tin and alloys thereof and indium and alloys thereof, and have an average particle size on the nano scale. Examples of the inorganic oxide include silica ($SiO_2$), alumina ($Al_2O_3$), titanium oxide ($TiO_2$), zirconia ($ZnO_2$) and zinc oxide (ZnO).

In the illustrated decorative coating 10, because the metal nanoparticles 1 are dispersed in the inorganic oxide layer 2, the distances between the particles are very small. Thus, the particles are present at a sufficiently high density to provide good metallic luster as seen by human eyes. In addition, when the radio waves pass through individual nanoparticles, the nanoparticles cause little millimeter wave loss. Thus, the decorative coating 10 has good transparency to radio waves.

In addition, because the metal nanoparticles 1 are dispersed in the inorganic oxide layer 2, the metal nanoparticles 1 can be protected from oxidation that is caused by the thermal energy which is emitted from an arc lamp during a xenon accelerated lightfastness and weathering test after the manufacture of a product. Thus, the decorative coating is effectively prevented from a decrease in durability due to oxidation of the metal nanoparticles.

According to the results of an experiment, which is described later, the thickness t of the decorative coating 10 is preferably adjusted in the range of 100 nm to 3 µm. The upper and lower limits are determined because high brightness cannot be achieved when the thickness t is smaller than 100 nm and the inorganic oxide layer easily peels (has low adhesion) when the thickness t is greater than 3 µm.

One example of the method of forming the decorative coating 10 is described briefly. First, metal nanoparticles of, for example, silver (0.15 mM (mM: millimolar)) are passed through ammonium persulfate solution (APS: 2.5 µM (µM: micromolar)) to adjust the pH (pH 4). A silica solution ($SiO_3^{2-}$: pH 9 at 0.02%) is added and excess $SiO_3^{2-}$ is removed. Then, 75 vol % ethanol is added to the solution to form a coating liquid, and toluene as an additional solvent is added to the coating liquid to form a liquid mixture. The liquid mixture is coated (applied and dried) on a surface of a front grill.

Figure 2A:
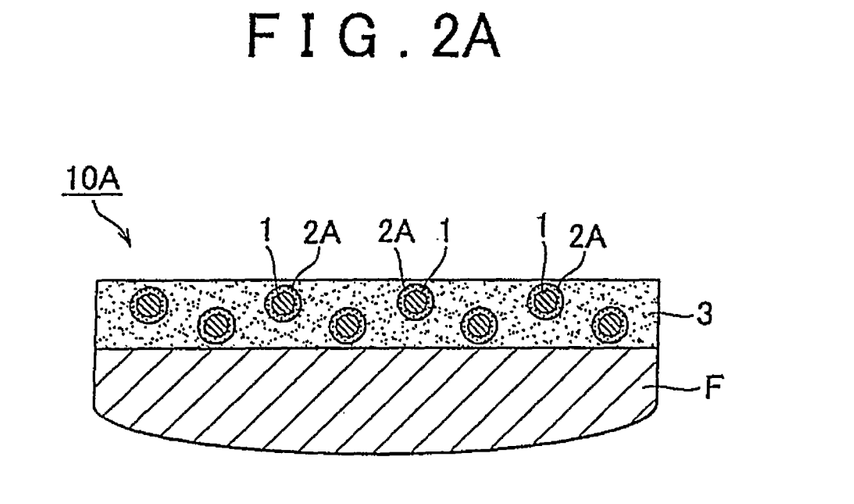
FIG. 2A is a schematic view that illustrates another embodiment of the decorative coating according to the present invention.
Figure 2B:
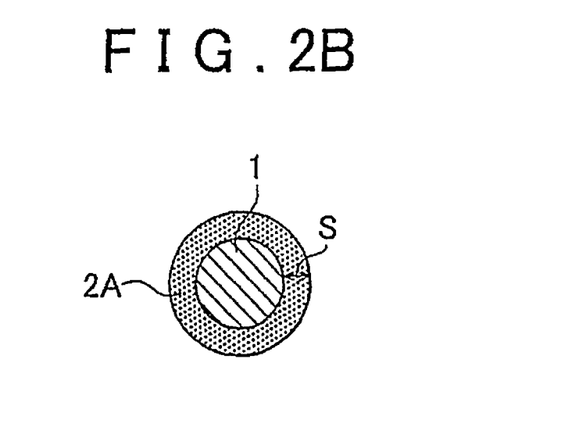
FIG. 2B is an enlarged view of a metal nanoparticle which is coated with an inorganic oxide coating.

A decorative coating 10A that is shown in FIG. 2A is composed of a organic substance layer 3 in which metal nanoparticles 1 that are coated with an inorganic oxide coating 2A are dispersed.

The decorative coating 10A is formed by the following method. First, metal nanoparticles of, for example, silver (0.15 mM) are passed through ammonium persulfate solution (APS: 2.5 µM) to adjust the pH (pH 4). A silica solution ($SiO_3^{2-}$:

pH 9 at 0.02%) is added and excess $SiO_3^{2-}$ is removed. Then, 75 vol % ethanol is added to the solution to form a coating liquid, and the coating liquid is coated (applied and dried) on a surface of a front grill.

According to the results of an experiment, which is described later, the thickness S (refer to FIG. 2B) of the inorganic oxide coating 2A is preferably adjusted in the range of 3 to 50 nm. This is because the radio wave transmission loss remains close to a desired value 1 dB when the thickness S is equal to or greater than 3 nm and a desirable reflectivity (brightness), which provides a brightness of 65% or higher, can be achieved when the thickness S is equal to or smaller than 50 nm.

The decorative coating WA also can provide good metallic luster and has high transparency to radio waves. In addition, the metal nanoparticles 1 can be protected from oxidation that is caused by the thermal energy which is emitted from an arc lamp during a xenon accelerated lightfastness and weathering test after the manufacture of a product. Thus, the decorative coating is effectively prevented from a decrease in durability due to the oxidation of the metal nanoparticles.

In addition, even if the organic substance layer 3 is deteriorated by the thermal energy that is emitted from an arc lamp during the xenon accelerated lightfastness and weathering test, the inorganic oxide coating 2A around the metal nanoparticles 1 prevents the metal nanoparticles 1 from aggregation.

Figure 3:
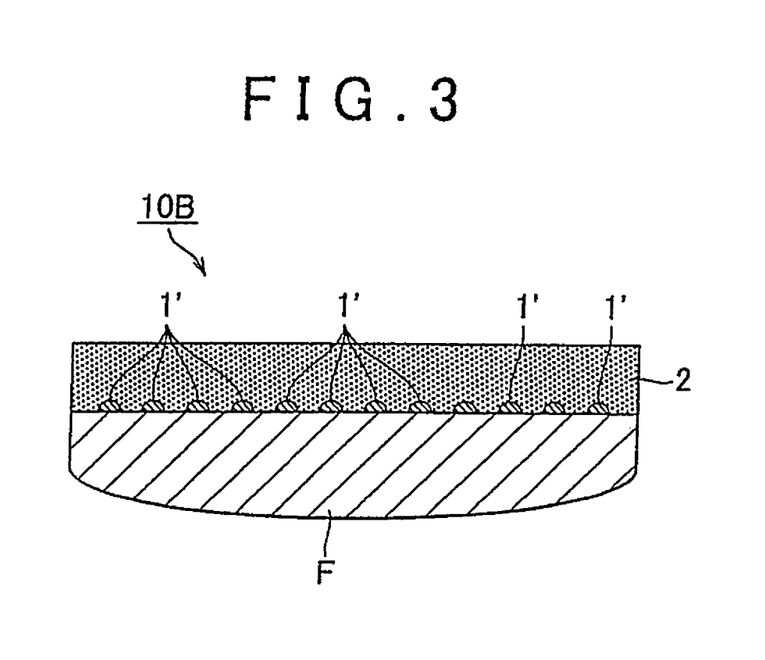
FIG. 3 is a schematic view that illustrates yet another embodiment of a decorative coating according to the present invention.

A decorative coating 10B that is shown in FIG. 3 is composed of metal nanoparticles 1' which are discontinuously formed in a layer on a surface of the front grill F and an inorganic oxide layer 2 that is formed over the metal nanoparticles 1'.

To form the decorative coating 10B, metal nanoparticles of, for example, silver are first discontinuously deposited on a surface of the front grill F by a method such as vacuum deposition, sputtering, ion plating, thermal CVD, plasma CVD or laser CVD. A silica solution ($SiO_3^{2-}$: pH 9 at 0.02%) is then added and excess $SiO_3^{2-}$ is removed. A coating liquid that contains 75 vol % of ethanol is mixed with toluene as an additional coating liquid to form a new coating liquid, and a surface of a front grill is coated with the coating liquid.

Figure 4:
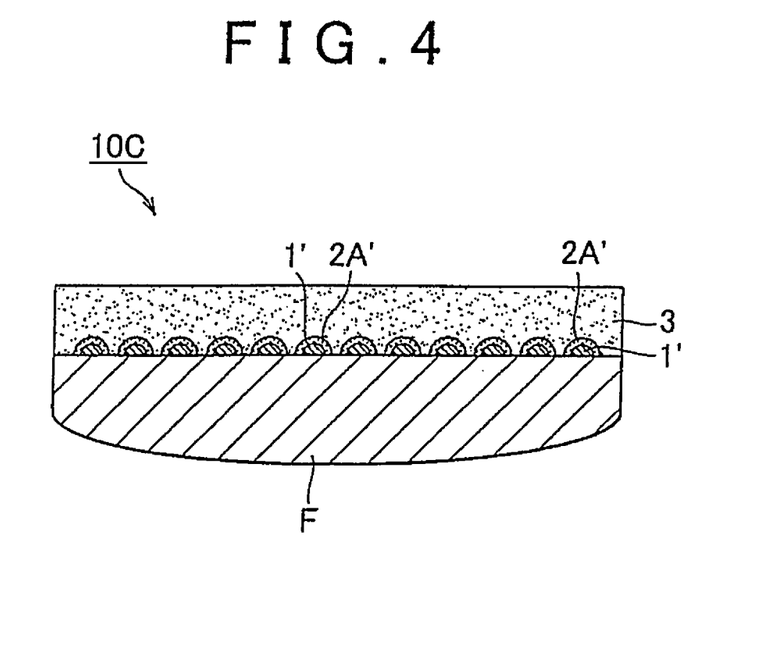
FIG. 4 is a schematic view that illustrates still yet another embodiment of a decorative coating according to the present invention.

A decorative coating 10C that is shown in FIG. 4 is composed of metal nanoparticles 1' that are coated with an inorganic oxide coating 2A' and discontinuously formed in a layer on a surface of the front grill F, and an organic substance layer 3 that is formed over the metal nanoparticles

[Experiment in which radio wave transmission loss and reflectivity were measured as the thickness of the inorganic oxide was varied in a decorative coating that contained metal nanoparticles which were coated with an inorganic oxide coating and results thereof]

The inventors conducted experiments in which radio wave transmission loss and reflectivity were measured in order to specify the optimum range of the thickness of the inorganic oxide coating on the surfaces of the metal nanoparticles.

Figure 5:
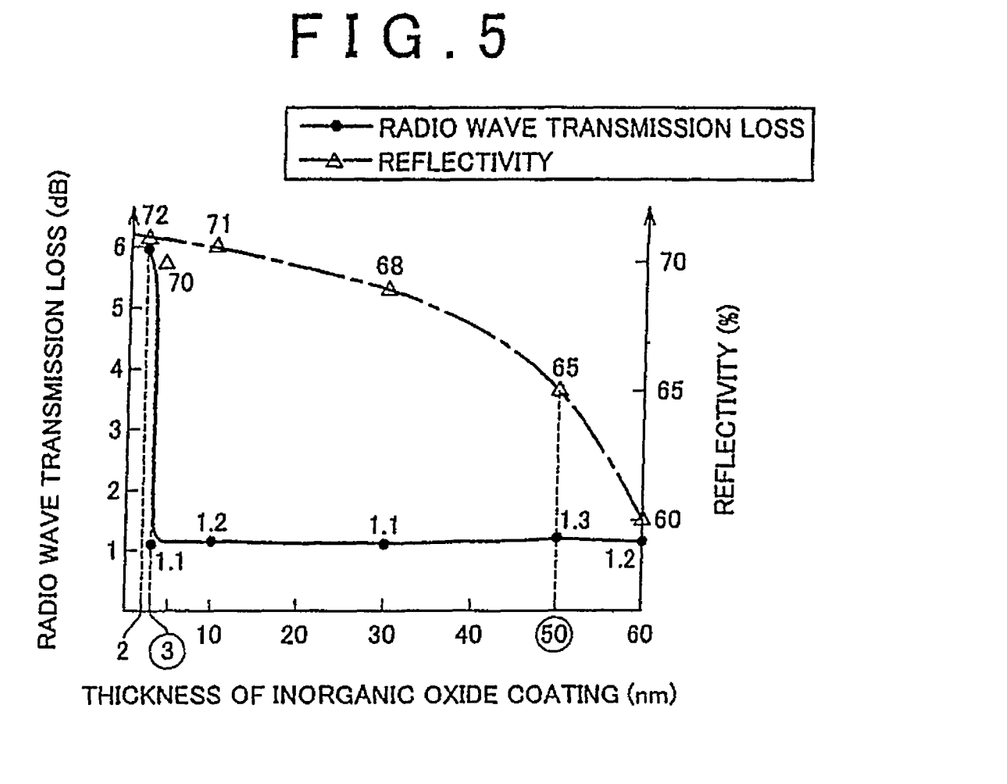
FIG. 5 is a graph that shows the result of an experiment in which radio wave transmission loss and reflectivity were measured as the thickness of an inorganic oxide coating was varied in a decorative coating that contained metal nanoparticles which were coated with the inorganic oxide coating.

In this experiment, metal nanoparticles of silver that were coated with inorganic oxide (silica) coatings with thicknesses of 2 nm, 3 nm, 10 nm, 30 nm, 50 nm and 60 nm were separately prepared, and the radio wave transmission loss at 76 GHz, which is a frequency for car-mounted millimeter-wave radars, was measured. As for the reflectivity, the reflectivity at a wavelength of 550 nm was measured for each type of the metal nanoparticles using a visible-ultraviolet spectrophotometer. The results of the experiment are shown in FIG.

5. The particle size of the metal nanoparticles was measured by diluting and dispersing the metal nanoparticles in toluene as a good solvent, dripping the liquid onto a microgrid, drying the liquid and measuring the particle size of the metal nanoparticles under a transmission electron microscope. In the measurement method, the diameters (maximum dimensions) of several hundreds of metal nanoparticles that were directly observed were measured and the average of the diameters was adopted.

In FIG. 5, the left axis of the graph represents the radio wave transmission loss, and the right axis of the graph represents the reflectivity. As for the radio wave transmission loss, the result was excellent as shown in FIG. 5. That is, the radio wave transmission loss had an inflection point when the thickness of the inorganic oxide coating was 2 nm and remained at around 1 dB, which is lower than 2 dB as a general threshold value for transparency to radio waves, when the thickness was equal to or greater than 3 nm.

The reflectivity (brightness) tended to decrease as the thickness of the inorganic oxide coating increased. The reflectivity had an inflection point when the thickness of the inorganic oxide coating was 50 nm, and shifted to a tendency to decrease sharply and fell below 65%, which can be considered as a threshold value for good brightness, after the inflection point.

The results of the experiment lead to a conclusion that the inorganic oxide coating preferably has a thickness not smaller than 3 nm and not greater than 50 nm. When the metal nanoparticles are coated with an inorganic oxide coating with a thickness in the above range, the decorative coating has excellent transparency to radio waves and excellent brightness.

[Xenon Test on Decorative Coatings that had an Inorganic Oxide Layer and Results Thereof]

The inventors prepared a sample (Example) corresponding to the decorative coating 10 that is shown in FIG. 1 (decorative coating that has an inorganic oxide layer) and a decorative coating that has a conventional organic substance layer as shown in FIG. 8A (Comparative Example). A xenon test was conducted on both samples, and the degree of hue change after the test was measured based on the Lab color difference. Table 1 shows the Lab values and changes in hue before and after the xenon test.

TABLE 1

|  | Hue | | | | | |
| --- | --- | --- | --- | --- | --- | --- |
|  | Before test | | | After test (180W, 750MJ) | | Change in |
|  | L | a | b | L | a | b | hue ΔE |
| Example | 65.36 | −3.76 | −8.95 | 64.34 | −4.77 | −7.54 | 2.01 |
| Comp. Example | 59.87 | −2.53 | −6.53 | 58.11 | −2.88 | 0.88 | 7.62 |

As shown in Table 1, the degree of change in hue of Example was less than 30% of that of Comparative Example, which indicates that change in hue that is caused by a xenon test can be significantly reduced.

In addition, the inventors have found that high brightness cannot be achieved when the thickness of the inorganic oxide layer is smaller than 100 nm and that the inorganic oxide layer easily peels when the thickness of the inorganic oxide layer is greater than 3 μm. This leads to a conclusion that the thickness of the inorganic oxide layer is preferably adjusted in the range of not smaller than 100 nm and not greater than 3 μm.

Examples of the resin substrate as an object to which the decorative coating of the above embodiment is applied include the emblem of the manufacturer of the vehicle and ornaments that are specially designed for the vehicle.

Examples of the metal nanoparticles include particles of metals such as gold and alloys thereof, alloys of silver, tin and alloys thereof, indium and alloys thereof in addition to silver which have an average particle size on the nano scale.

Examples of the inorganic oxide include, in addition to silica ($SiO_2$), alumina ($Al_2O_3$), titanium oxide ($TiO_2$), zirconia ($ZnO_2$) and zinc oxide (ZnO).

While embodiments of the prevent invention have been descried with reference to drawings, it should be noted that the specific configuration is not limited to the embodiment and any changes in design or the like which do not depart from the gist of the present invention are included in the present invention.

The invention claimed is:

1. A decoratively coated resin substrate that can be placed in a path of electromagnetic waves of a radar device, comprising:
   a resin substrate and a decorative coating on the resin substrate,
   wherein the decorative coating comprises:
   metal nanoparticles;
   an inorganic oxide material coated on the metal nanoparticles; and
   an organic substance layer coated over the inorganic oxide-coated metal nanoparticles,
   wherein the inorganic oxide-coated metal nanoparticles are present as a discontinuous layer on a surface of the resin substrate.

2. The decoratively coated resin substrate according to claim 1, wherein a thickness of the inorganic oxide material that is coated on the metal nanoparticles is in a range of from 3 to 50 nm.

3. The decoratively coated resin substrate according to claim 1, wherein the metal nanoparticles are silver particles.

4. The decoratively coated resin substrate according to claim 1, wherein the inorganic oxide material is silica.

* * * * *